US008929731B2

(12) United States Patent
Youn et al.

(10) Patent No.: US 8,929,731 B2
(45) Date of Patent: Jan. 6, 2015

(54) APPARATUS FOR MEASURING PERFORMANCE OF COHERENT OPTICAL RECEIVER

(71) Applicant: Electronics and Telecommunications Research Institute, Daejeon (KR)

(72) Inventors: Chun Ju Youn, Daejeon (KR); Joong-Seon Choe, Daejeon (KR); Jong-Hoi Kim, Daejeon (KR); Duk Jun Kim, Daejeon (KR); Yong-Hwan Kwon, Daejeon (KR); Eun Soo Nam, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 134 days.

(21) Appl. No.: 13/687,741

(22) Filed: Nov. 28, 2012

(65) Prior Publication Data
US 2013/0156424 A1 Jun. 20, 2013

(30) Foreign Application Priority Data
Dec. 14, 2011 (KR) .......................... 10-2011-0134352

(51) Int. Cl.
*H04B 10/08* (2006.01)
*H04B 17/00* (2006.01)
*H04B 10/06* (2006.01)
*H04B 10/61* (2013.01)
*H04B 10/079* (2013.01)

(52) U.S. Cl.
CPC .......... *H04B 10/614* (2013.01); *H04B 10/0799* (2013.01)

USPC .................... 398/25; 398/9; 398/38; 398/206

(58) Field of Classification Search
CPC ....... H04B 10/60; H04B 10/614; H04B 10/07
USPC ................................ 398/16, 25–27, 202, 206
See application file for complete search history.

(56) References Cited

U.S. PATENT DOCUMENTS

2011/0129213 A1 6/2011 Painchaud et al.

OTHER PUBLICATIONS

Zhi Li et al., "High-Power Integrated Balanced Photodetector", IEEE Photonics Technology Letters, Dec. 15, 2009, pp. 1858-1860, vol. 21, No. 24.

*Primary Examiner* — David Payne
*Assistant Examiner* — Casey Kretzer
(74) *Attorney, Agent, or Firm* — Rabin & Berdo, P.C.

(57) ABSTRACT

An apparatus for measuring performance of a coherent optical receiver includes a beam splitter splitting light into first and second paths, a first optical modulator modulating the first path light, a variable optical attenuator controlling an optical power of the first optical modulator, a first polarization controller transmitting a signal controlling polarization of an output of the variable optical attenuator to the coherent optical receiver, a second optical modulator modulating the second path light, a variable optical delay line delaying time of an output of the second optical modulator, a second polarization controller transmitting a signal controlling polarization of an output of the variable optical delay line to the coherent optical receiver, a network analyzer measuring performance of the coherent optical receiver and controlling the optical modulators, and a controller transmitting a control signal to the optical modulators.

10 Claims, 6 Drawing Sheets

APPARATUS FOR MEASURING PERFORMANCE OF COHERENT OPTICAL RECEIVER

CROSS-REFERENCE TO RELATED APPLICATIONS

This US non-provisional patent application claims priority under 35 USC §119 to Korean Patent Application No. 10-2011-0134352, filed on Dec. 14, 2011, the entirety of which is hereby incorporated by reference.

BACKGROUND OF THE INVENTION

The present general inventive concept relates to apparatuses for measuring performance of a coherent optical receiver and, more particularly, to an apparatus for measuring performance of a coherent optical receiver which measures a common mode rejection ratio.

With the continuous increase in communication capacity, a direct detection method has been conventionally used in an optical communication system of 100 Gb/s or more to detect an optical signal. However, a coherent detection method is increasingly used in recent years. The coherent detection method may improve spectral efficiency to make ultrahigh-speed transmission available and compensate transmission quality degradation through digital signal processing in an electrical region of a receiving terminal.

An optical receiver is used in a coherent detection method for detecting optical signals. Bandwidth, common mode rejection ratio, and channel skew, which are performance index of a coherent optical receiver, may have a great effect on performance of the coherent detection method. Accordingly, there is a need for a method for measuring performance index of the coherent optical receiver.

A typical coherent optical receiver includes a 90-degree optical hybrid, a balanced optical receiver, and a transimpedance amplifier. Conventionally, bandwidth and common mode rejection ratio of a balanced optical receiver, not a coherent optical receiver, have been measured. While it is relatively easy to measure bandwidth and common mode rejection ratio of a balanced optical receiver itself, it is not easy to measure bandwidth and common mode rejection ratio of a coherent optical receiver to which a 90-degree optical hybrid is connected.

As a method for directly measuring a common mode rejection ratio of a coherent optical receiver, there is a method using a common optical modulator and measuring a differential mode component with a single port input, which is opposite to the case of a balanced optical receiver, and a common mode component with a dual port input through a phase modulator at one side path. However, this method is limited in measuring accurate performance of a coherent optical receiver because a maximum value at each frequency is assumed as a common mode component to be bused in a common mode rejection ratio through repeated tests with phase modulation.

SUMMARY OF THE INVENTION

Embodiments of the inventive concept provide an apparatus for measuring performance of a coherent optical receiver. In some embodiments, the apparatus may include a beam splitter splitting light received from a light source into a first path light and a second path light, a first optical modulator receiving the first path light of the beam splitter and optically modulating the received first path light, a variable optical attenuator controlling and outputting an optical power of an output of the first optical modulator, a first polarization controller transmitting a first output signal controlling polarization of an output of the variable optical attenuator to the coherent optical receiver, a second optical modulator receiving the second path light of the beam splitter and optically modulating the received second path light, a variable optical delay line delaying and outputting time of an output of the second optical modulator, a second polarization controller transmitting a second output signal controlling polarization of an output of the variable optical delay line to the coherent optical receiver, a network analyzer receiving an output of the coherent optical receiver to measure performance of the coherent optical receiver and controlling the first optical modulator and the second optical modulator, and a controller receiving a control signal from the network analyzer and transmitting the received control signal to the first optical modulator and the second optical modulator.

According to an example embodiment, the variable optical attenuator may control the optical power of the output of the first optical modulator such that the first output signal and the second output signal transmitted to the coherent optical receiver have the same optical power.

According to an example embodiment, the first polarization controller may control the polarization of the output of the variable optical attenuator such that the first output signal and the second output signal transmitted to the coherent optical receiver have the same polarization.

According to an example embodiment, the second polarization controller may control the polarization of the output of the variable optical attenuator such that the first output signal and the second output signal transmitted to the coherent optical receiver have the same polarization.

According to an example embodiment, the variable optical delay line may control time of the output of the second optical modulator such that the first output signal and the second output signal transmitted to the coherent optical receiver are made identical in time synchronization.

According to an example embodiment, the network analyzer may receive an output of the coherent optical receiver to measure bandwidth, common mode rejection ratio or channel skew of the coherent optical receiver.

According to an example embodiment, the first optical modulator and the second optical modulator may optically modulate the first path light and the second path light of the beam splitter, respectively such that the first output signal and the second output signal transmitted to the coherent optical receiver have same phase and intensity.

According to an example embodiment, the first optical modulator and the second optical modulator may optically modulate the first path light and the second path light of the beam splitter, respectively such that the first output signal and the second output signal transmitted to the coherent optical receiver have same intensity and opposite phases.

According to an example embodiment, the controller may control the first optical modulator and the second optical modulator such that the first output signal and the second output signal transmitted to the coherent optical receiver have same phase and intensity.

According to an example embodiment, the controller may be a power divider.

According to an example embodiment, the controller may control the first path light and the second path light of the beam splitter such that the first output signal and the second output signal transmitted to the coherent optical receiver have same intensity and opposite phases.

According to an example embodiment, the controller may be a 180-degree hybrid.

BRIEF DESCRIPTION OF THE DRAWINGS

The inventive concept will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the inventive concept.

DETAILED DESCRIPTION

The advantages and features of the inventive concept and methods of achieving them will be apparent from the following exemplary embodiments that will be described in more detail with reference to the accompanying drawings. It should be noted, however, that the inventive concept is not limited to the following exemplary embodiments, and may be implemented in various forms. Accordingly, the exemplary embodiments are provided only to disclose examples of the inventive concept and to let those skilled in the art understand the nature of the inventive concept.

There is a method for measuring bandwidth and common mode rejection ratio of a balanced optical receiver, not a coherent optical receiver. In this method, an optical signal is input to one of two input ports to measure a common mode component of the balanced optical receiver and an optical signal is input to both the two input ports to measure a differential mode component. This method can be used to measure common mode rejection ratio, bandwidth and the like of a balanced optical receiver. However, this method cannot be used to measure common mode rejection ratio of a coherent optical receiver where a 90-degree optical hybrid is connected to an input terminal of a balanced optical receiver.

Figure 1:
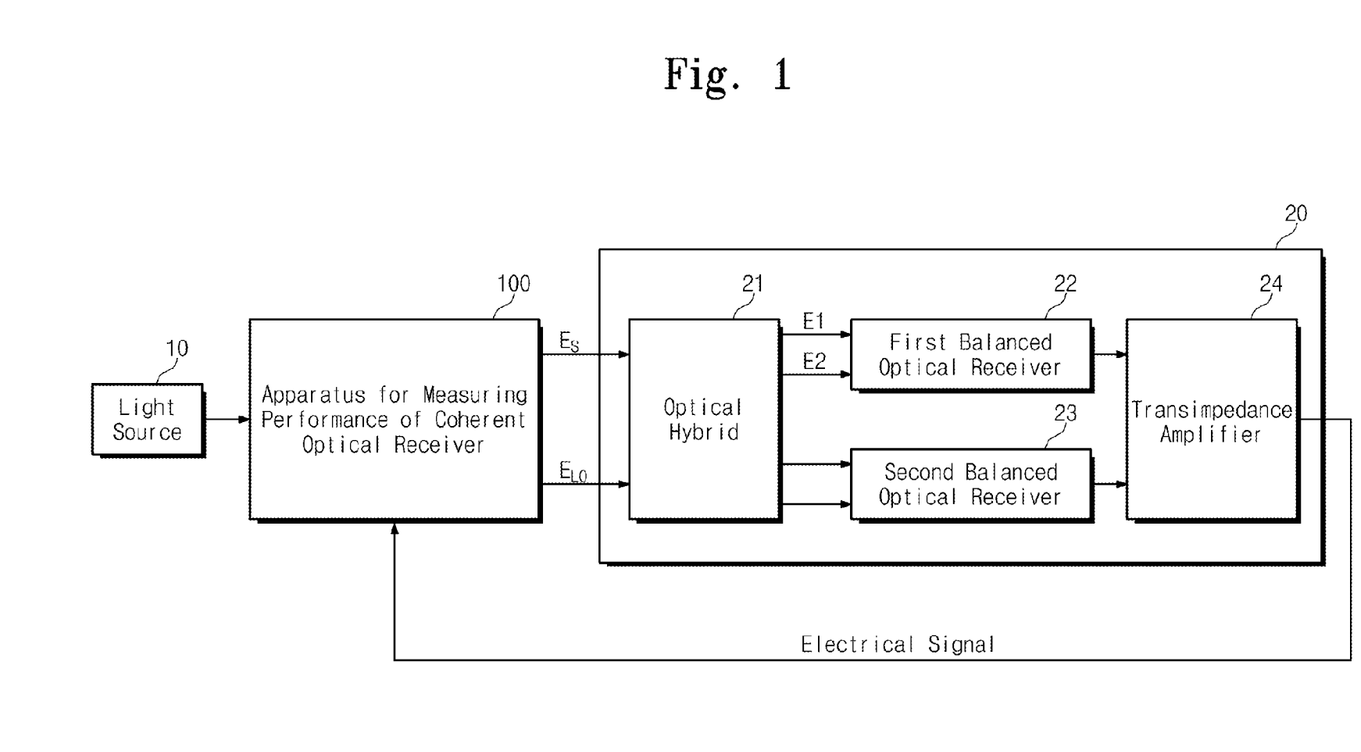
FIG. 1 illustrates the measurement of performance of a coherent optical receiver through an apparatus for measuring performance of a coherent optical receiver according to an embodiment of the inventive concept.

Reference is made to FIG. 1, which illustrates the measurement of performance of a coherent optical receiver 20 through an apparatus 100 for measuring performance of a coherent optical receiver according to an embodiment of the inventive concept.

The coherent optical receiver 20 includes an optical hybrid 21, a first balanced optical receiver 22, a second balanced optical receiver 23, and a transimpedance amplifier 24.

A light source 10 generates light to measure performance of the coherent optical receiver 20 and transfers the generated light to the measuring apparatus 100.

The measuring apparatus 100 receives the light from the light source 10 and transmits a first output signal $E_S$ and a second output signal $E_{LO}$ to the coherent optical receiver 20.

Common mode rejection ratio (CMRR) of the coherent optical receiver 20 may be defined by equation (1), as follows:

$$CMRR(\text{dB}) = 20\log\left(\frac{I_1 - I_2}{I_1 + I_2}\right) = 20\log\left(\frac{\Delta I}{I_1 + I_2}\right) \quad \text{Equation (1)}$$

wherein $I_1$ represents the amplitude of an output signal by $E_1$ in the first balanced optical receiver 22, $I_2$ represents the amplitude of an output signal by $E_2$ in the first balanced optical receiver 22, a denominator $(I_1+I_2)$ represents the magnitude of a common mode component, and a numerator $(I_1-I_2)$ represents the magnitude of a differential mode component.

Reference numerals $E_1$ and $E_2$ denote output signals $E_1$ and $E_2$ of the optical hybrid 21. Also the reference numerals $E_1$ and $E_2$ denote a first input signal $E_1$ and a second input signal $E_2$ which are input to the first balanced optical receiver 22. The signals $E_1$ and $E_2$ may be defined by equation (2), as follows:

$$E_1(t) = E_S(t) + E_{LO}(t)$$

$$E_2(t) = E_S(t) - E_{LO}(t) \quad \text{Equation (2)}$$

wherein $E_S(t)$ and $E_{LO}(t)$ denote a first output signal $E_S$ and a second output signal $E_{LO}$ of the measuring apparatus 100 which are input to two input ports of the coherent optical receiver 20, respectively.

In order to measure a differential mode component of the coherent optical receiver 20, it is necessary to measure differential mode components of the first balanced optical receiver 22 incorporated in the coherent optical receiver 20. As described above, an optical signal must be input to both two input ports of a balanced optical receiver to measure a differential mode component of the balanced optical receiver. That is, the first and second input signals $E_1$ and $E_2$ input to the first and balanced optical receiver 22 must be identical to each other. For example, when the second output signal $E_{LO}$ of the measuring apparatus 100 is 0, the first and second input signals $E_1$ and $E_2$ input to the first balanced optical receiver 22 becomes identical to each other and the differential mode component of the coherent optical receiver 20 may be measured.

In order to measure a common mode component of the coherent optical receiver 20, it is necessary to measure common mode components of the first and second balanced optical receivers 22 and 23 incorporated in the coherent optical receiver 20. As described above, an optical signal must be input to one of two input ports of a balanced optical receiver to measure a common mode component of the balanced optical receiver. That is, the second input signal $E_2$ must not be 0 when the first input signal $E_1$ input to the first balanced optical receiver 22 is 0, and the first input signal $E_1$ must not be 0 when the second input signal $E_2$ is 0. For example, when a first output signal $E_S$ and a second output signal $E_{LO}$ of the measuring apparatus 100 are identical to each other, the first input signal $E_1$ input to the first and balanced optical receiver 22 is not 0 and the second signal $E_2$ is 0. In addition, when the first output signal $E_S$ of the measuring apparatus 100 has an opposite sign to the second output signal $E_{LO}$ while having the same absolute value as the second output signal $E_{LO}$, the first input signal $E_1$ input to the first and balanced optical receiver 22 is 0 and the second input signal $E_2$ is not 0. In these two cases, a common mode component of the coherent optical receiver 20 may be measured.

To sum up, a differential mode component may be measured when $E_L$ is 0, and a common mode component of $I_1$ via $E_1$ may be measured when $E_{LO}$ is identical to $E_S$. In addition, bandwidth and a common mode component of $I_2$ via $E_2$ may be measured when $E_{LO}$ is identical to $-E_S$.

Using the explanations in FIG. 1, embodiments of the apparatus 100 for measuring performance of a coherent optical receiver 20 will now be described below with reference to accompanying drawings.

Figure 2:
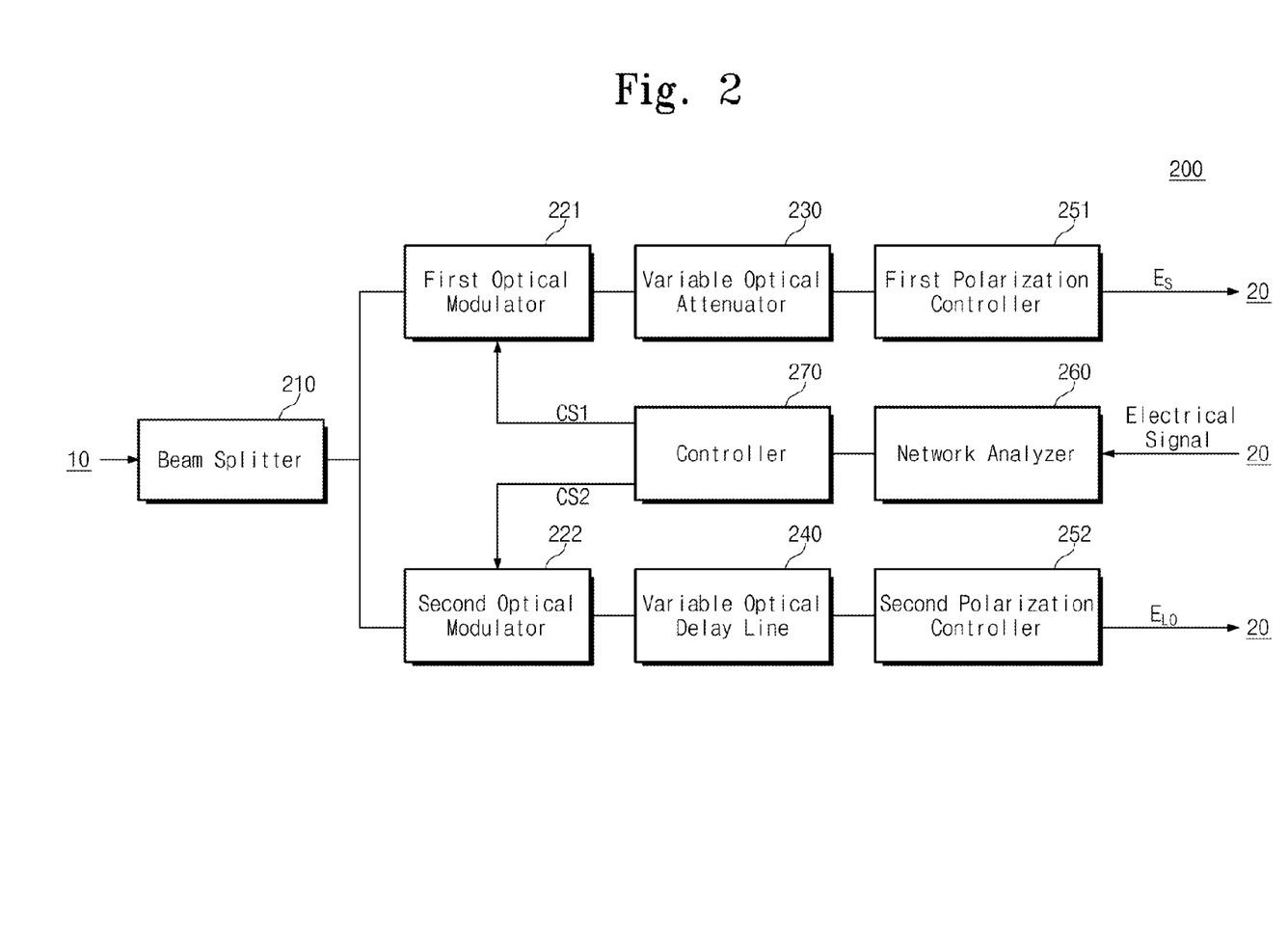
FIG. 2 illustrates an apparatus for measuring performance of a coherent optical receiver according to an embodiment of the inventive concept.

Reference is made to FIG. 2, which illustrates an apparatus 200 for measuring performance of a coherent optical receiver 20 according to an embodiment of the inventive concept. The measuring apparatus 200 includes a beam splitter 210, a first optical modulator 221, a second optical modulator 222, a variable optical attenuator 230, a variable optical delay line 240, a first polarization controller 251, a second polarization controller 252, a network analyzer 260, and a controller 270.

The beam splitter 210 receives light from a light source 10 and splits the received light into first path light and second path light. The first path light is transmitted to the first optical modulator 221, and the second path light is transmitted to the second optical modulator 222.

The first optical modulator 221 receives the first path light from the beam splitter 210 and transmits the received first path light to the variable optical attenuator 230 after optically modulating the received first path light. The first optical modulator 221 may optically modulate the received first path light to control phase and intensity of a first output signal $E_S$ transferred to the coherent optical receiver 20 from the measuring apparatus 200. Exemplarily, the first optical modulator 221 may optically modulate the first path light such that the phase and intensity of the first output signal $E_S$ transferred to the coherent optical receiver 20 are made equal to those of a second output signal $E_{LO}$. In addition, the first optical modulator 221 may optically modulate the first path light such that the intensity of the first output signal $E_S$ is made equal to that of the second output signal $E_{LO}$ while the phase of the first output signal $E_S$ is made opposite to that of the second output signal $E_{LO}$.

The variable optical attenuator 230 receives the optically modulated first path light from the first modulator 221. The optically modulated first path light is transferred to the first polarization controller 251 after controlling an optical power of the optically modulated first path light. The variable optical attenuator 230 controls the optical power of the optically modulated first path light such that the first output signal $E_S$ transferred to the coherent optical receiver 20 from the measuring apparatus 200 has the same optical power as the second output signal $E_{LO}$.

The first polarization controller 251 receives the optical-power-controlled first path light from the variable optical attenuator 230. The first polarization controller 251 transfers the optical-power-controlled first path light to the coherent optical receiver 20 after controlling the polarization of the optical-power-controlled first path light. The first polarization controller 251 may control the polarization of the received first path light such that the first output signal $E_S$ transferred to the coherent optical receiver 20 from the measuring apparatus 200 has the same polarization as the second output signal $E_{LO}$.

The second optical modulator 222 receives the second path light from the beam splitter 210 and transfers the received second path light to the variable optical delay line 240 after optically modulating the received second path light. The second optical modulator 222 may optically modulate the received second path light to control phase and intensity of the second output signal $E_{LO}$ transmitted to the coherent optical receiver 20 from the measuring apparatus 200. Exemplarily, the second optical modulator 222 may optically modulate the second path light such that the phase and intensity of the second output signal $E_{LO}$ transmitted to the coherent optical receiver 20 are made equal to those of the first output signal $E_S$. In addition, the second optical modulator 222 may optically modulate the second path light such that the intensity of the first output signal $E_S$ is made equal to that of the second output signal $E_{LO}$ while the phase of the first output signal $E_S$ is made opposite to that of the second output signal $E_{LO}$.

The variable optical delay line 240 receives the optically modulated second path light from the second modulator 222. The variable optical delay line 240 transfers the optically modulated second path to the second polarization controller 252 after controlling time of the optically modulated second path light. The variable optical delay line 240 may control the light time of the optically modulated second path light such that the second output signal $E_{LO}$ transferred to the coherent optical receiver 20 from the measuring apparatus 200 has the same time synchronization as the first output signal $E_S$.

The second polarization controller 252 receives the time-controlled second path light from the variable optical delay line 240. The second polarization controller 252 transfers the time-controlled second path light to the coherent optical receiver 20 after controlling the polarization of the time-controlled second path light. The second polarization controller 252 may control the polarization of the time-controlled second path light such that the second output signal $E_{LO}$ transferred to the coherent optical receiver 20 from the measuring apparatus 200 has the same polarization as the first output signal $E_S$.

The network analyzer 260 receives an output electrical signal of the coherent optical receiver 20 and measures performance of the coherent optical receiver 20 through the received optical signal. The network analyzer 260 may measure bandwidth, common mode rejection ratio (CMRR) or channel skew of the coherent optical receiver 20 by receiving an output of the coherent optical receiver 20. The network analyzer 260 may measure the above-mentioned bandwidth, common mode rejection ratio (CMRR) or channel skew, which are performance index of the coherent optical receiver, by comparing a control signal with the received output electrical signal of the coherent optical receiver 20.

The controller 270 in FIG. 2 receives a control signal from the network analyzer 260 and transmits the control signal to the first optical modulator 221 and the second optical modulator 222 after dividing the received control signal into a first control signal CS1 and a second control signal CS2, respectively. The first control signal CS1 is transmitted to the first optical modulator 221, and the second control signal CS2 is transmitted to the second optical modulator 222.

The first control signal CS1 may control the first optical modulator 221 to control the phase and intensity of the first output signal $E_S$ transferred to the coherent optical receiver 20 from the measuring apparatus 200. Exemplarily, the first control signal CS1 may control the first optical modulator 221 such that the phase and intensity of the first output signal $E_S$ transmitted to the coherent optical receiver 20 are made equal to those of the second output signal $E_{LO}$. In addition, the first control signal CS1 may control the first optical modulator 221 such that the intensity of the first output signal $E_S$ is made equal to that of the second output signal $E_{LO}$ while the phase of the first output signal $E_S$ is made opposite to that of the second output signal $E_{LO}$.

The second control signal CS2 may control the second optical modulator 222 to control the phase and intensity of the second output signal $E_{LO}$ transmitted to the coherent optical receiver 20 from the measuring apparatus 200. Exemplarily, the second control signal CS2 may control the second optical modulator 222 such that the phase and intensity of the first output signal $E_{LO}$ transmitted to the coherent optical receiver 20 are made equal to those of the first output signal $E_S$. In addition, the second control signal CS2 may control the second optical modulator 222 such that the intensity of the second output signal $E_{LO}$ is made equal to that of the first output signal $E_S$ while the phase of the second output signal $E_{LO}$ is made opposite to that of the first output signal $E_S$.

As described above, the network analyzer 260 may control the first and second optical modulators 221 and 222 through first and second control signals to control the first and second output signals $E_S$ and $E_{LO}$ for directly measuring the performance of the coherent optical receiver 20. Although not shown in the figure, operations of the variable optical attenuator 230, the variable optical delay line 240, the first polarization controller 251, and the second polarization controller 252 may be controlled as a modified embodiment for directly measuring the performance of the coherent optical receiver 20.

Figure 3A:
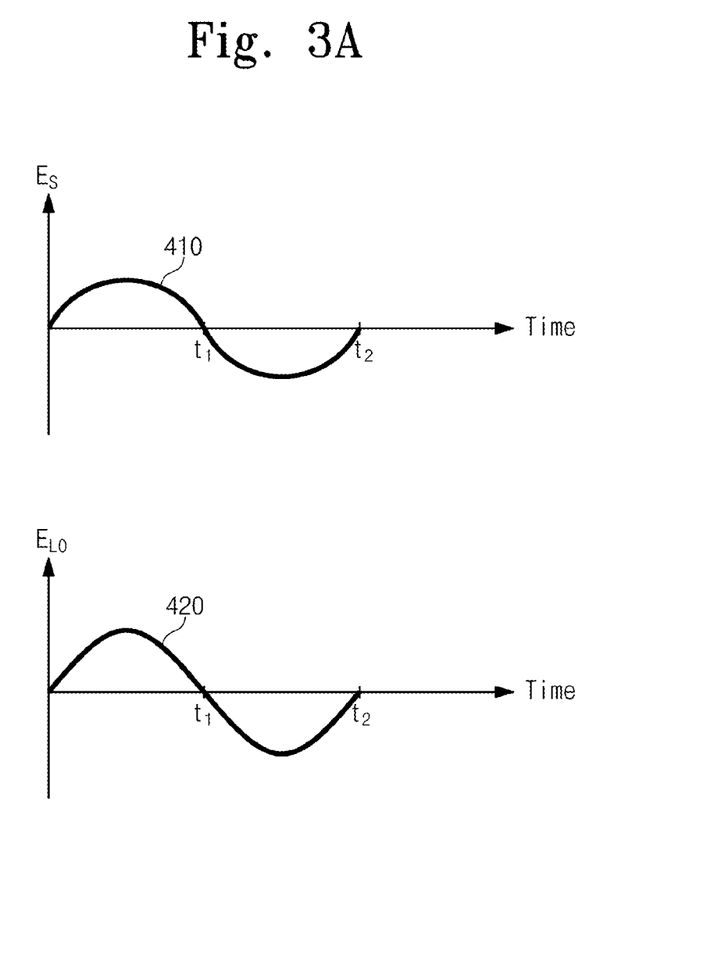
FIG. 3A illustrates an output signal of an apparatus for measuring performance of a coherent optical receiver which measures a common mode component $I_1$ of the coherent optical receiver.

Reference is made to FIG. 3A, which illustrates an output signal of an apparatus for measuring performance of a coherent optical receiver which measures a common mode component $I_1$ of the coherent optical receiver. In FIG. 3A, a first output signal ($E_S$) 410 and a second output signal ($E_{LO}$) 420 are exemplarily shown on the basis of time.

The first output signal ($E_S$) 410 and the second output signal ($E_{LO}$) 420 are equal in phase and intensity. As described in detail with reference to FIG. 1, when the first output signal ($E_S$) 410 and the second output signal ($E_{LO}$) 420 of the measuring apparatus 200 are identical to each other, in accordance with the equation (2), the first input signal $E_1$ input to the first balanced optical receivers 22 is not 0 and the second input signal $E_2$ is 0. Accordingly, in this case, the network analyzer 260 may measure the bandwidth and the common mode component $I_1$ via the first input signal $E_1$.

Figure 3B:
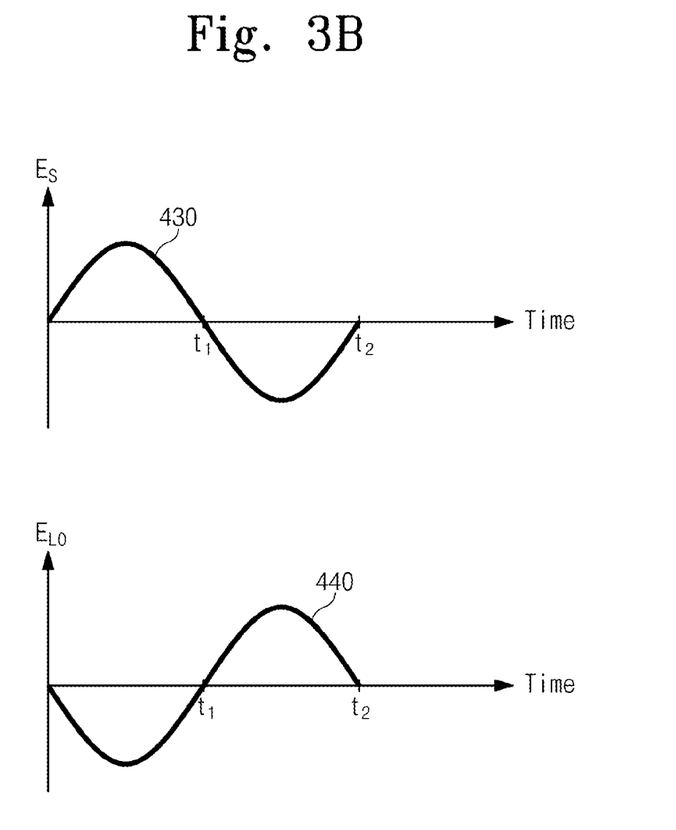
FIG. 3B illustrates an output signal of an apparatus for measuring performance of a coherent optical receiver which measures a common mode component $I_2$ of the coherent optical receiver.

Reference is made to FIG. 3B, which illustrates an output signal of an apparatus for measuring performance of a coherent optical receiver which measures a common mode component $I_2$ of the coherent optical receiver. In FIG. 3B, a first output signal ($E_S$) 430 and a second output signal ($E_{LO}$) 440 are exemplarily shown on the basis of time.

While the first output signal ($E_S$) 430 and the second output signal ($E_{LO}$) 440 have the same intensity, their phase difference is 180 degrees. That is, their signs are opposite to each other and their absolute values are equal to each other. As described above, when the first output signal ($E_S$) 430 and the second output signal ($E_{LO}$) 440 of the measuring apparatus 200 are opposite in sign and equal in absolute value, the first input signal $E_1$ input to the first balanced optical receiver 22 is 0 and a second input signal $E_2$ is not 0 according to the foregoing equation (2). Accordingly, the network analyzer 260 may measure bandwidth and a common mode component $I_2$ via the second input signal $E_2$.

Figure 3C:
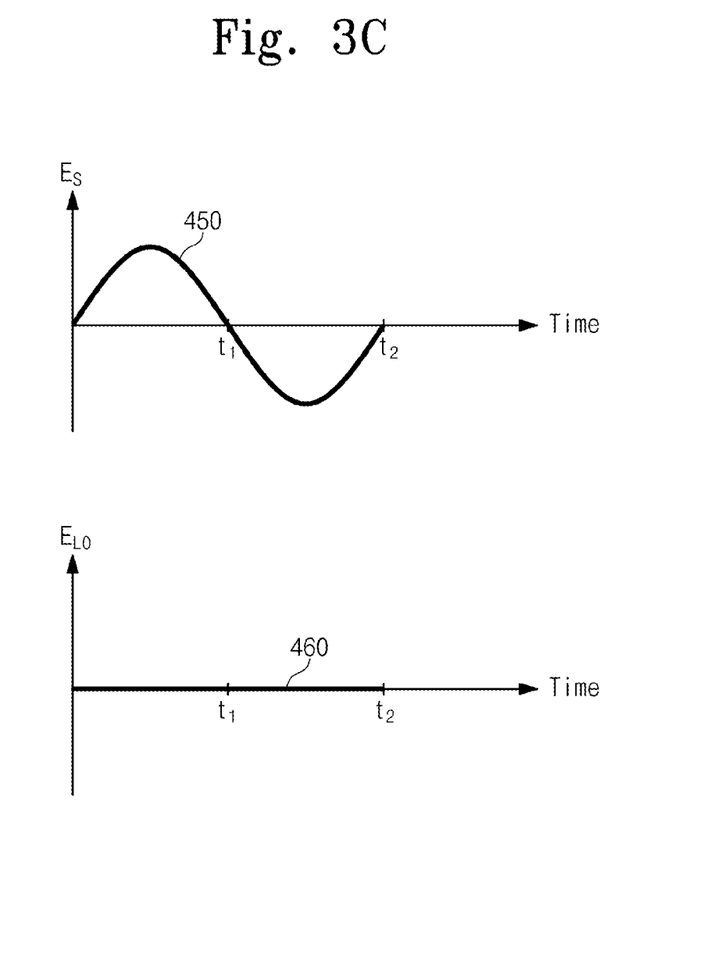
FIG. 3C illustrates an output signal of an apparatus for measuring performance of a coherent optical receiver which measures a differential mode component of the coherent optical receiver.

Reference is made to FIG. 3C, which illustrates an output signal of an apparatus for measuring performance of a coherent optical receiver which measures a differential mode component of the coherent optical receiver. In FIG. 3C, a first output signal ($E_S$) 450 and a second output signal ($E_{LO}$) 460 are exemplarily shown on the basis of time.

The first output signal ($E_S$) 450 is a predetermined signal, but the second output signal ($E_{LO}$) is 0. As described in detail with reference to FIG. 1, when the first output signal ($E_S$) 450 of the measuring apparatus 200 is not 0 and the second output signal ($E_{LO}$) 440 is 0, the first and second input signals $E_1$ and $E_2$ input to the first and balanced optical receiver 22 are identical to each other according to the foregoing equation (2). Accordingly, in this case, the network analyzer 260 may measure a differential mode component of the coherent optical receiver 20.

Figure 4:
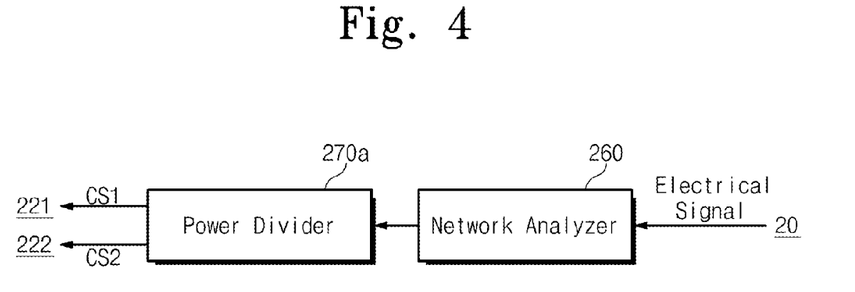
FIG. 4 illustrates a controller incorporated in the apparatus for measuring performance of a coherent optical receiver in FIG. 2.

Reference is made to FIG. 4, which illustrates a controller incorporated in the apparatus for measuring performance of a coherent optical receiver in FIG. 2. In FIG. 4, a power divider 270a is shown which acts as a controller generating and outputting a first control signal CS1 and a second control signal CS2.

The power divider 270a receives an output of a coherent optical receiver 20 from a network analyzer 260 and generates and transmits a first control signal CS1 and a second control signal CS2 to a first and second optical modulator 221 and 222, respectively. The power divider 270a may equivalently divide a constant signal. Thus, the first and second control signals CS1 and CS2 may be identical to each other. As previously described in FIG. 3A, when the first control signal CS1 and the second control signal CS2 are identical to each other, the network analyzer 260 may measure a common mode component $I_1$.

Figure 5:
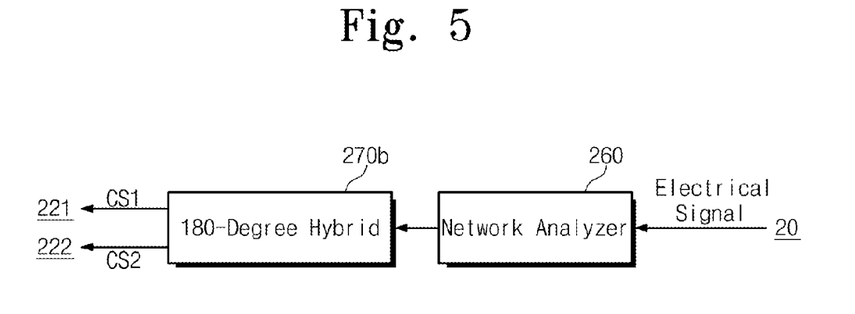
FIG. 5 illustrates a controller incorporated in the apparatus for measuring performance of a coherent optical receiver in FIG. 2.

Reference is made to FIG. 5, which illustrates a controller incorporated in the apparatus for measuring performance of a coherent optical receiver in FIG. 2. In FIG. 5, a 180-degree hybrid 270b is shown which acts as a controller generating and outputting a first control signal CS1 and a second control signal CS2.

The 180-degree hybrid 270b receives an output of a coherent optical receiver 20 from a network analyzer 260 and generates and transmits a first control signal CS1 and a second control signal CS2 to a first optical modulator 221 and a second optical modulator 222, respectively. The 180-degree hybrid 270b may divide a constant signal to have a phase difference of 180 degrees. Thus, while the first control signal CS1 and the second control signal CS2 may have the same intensity, their phase difference may be 180 degrees. As previously described in FIG. 3B, when the first control signal CS1 and the second control signal CS2 are equal in absolute value and opposite in sign, the network analyzer 260 may measure a common mode component $I_2$.

An apparatus 200 for measuring performance of a coherent optical receiver according to an embodiment of the inventive concept may directly measure bandwidth and common mode rejection ratio that are performance index of a balanced optical receiver incorporated in a coherent optical receiver 20 and the coherent optical receiver 20 including a 90-degree optical hybrid 21. Thus, the measuring apparatus 200 may measure more accurate performance of the coherent optical receiver 20 than a typical device for measuring performance of a coherent optical receiver.

As described so far, an apparatus for measuring performance of a coherent optical receiver according to the inventive concept can directly measure common mode rejection ratio and more accurately measure the common mode rejection ratio.

While the inventive concept has been particularly shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. An apparatus for measuring performance of a coherent optical receiver, comprising:
a beam splitter configured to split light received from a light source into a first path light and a second path light;
a first optical modulator configured to receive the first path light of the beam splitter and optically modulate the received first path light;
a variable optical attenuator configured to control and output an optical power of an output of the first optical modulator;
a first polarization controller configured to transmit a first output signal controlling polarization of an output of the variable optical attenuator to the coherent optical receiver;
a second optical modulator configured to receive the second path light of the beam splitter and optically modulate the received second path light;
a variable optical delay line configured to delay and output time of an output of the second optical modulator;
a second polarization controller configured to transmit a second output signal controlling polarization of an output of the variable optical delay line to the coherent optical receiver;
a network analyzer configured to receive an output of the coherent optical receiver to measure performance of the coherent optical receiver and control the first optical modulator and the second optical modulator; and
a controller configured to receive a control signal from the network analyzer and transmit the received control signal to the first optical modulator and the second optical modulator, wherein the network analyzer is
configured to measure the performance of the coherent optical receiver using a first common mode component, a second common mode component and a differential mode component,
configured to so control the first and second optical modulators that the polarized output of the variable optical attenuator and the polarized output of the variable optical delay line have a same phase and intensity, to thereby measure the first common mode component,
configured to so control the first and second optical modulators that the polarized output of the variable optical attenuator and the polarized output of the variable optical delay line have a same intensity and opposite phases, to thereby measure the second common mode component, and
configured to so control the first and second optical modulators that the polarized output of the variable optical attenuator differs from the polarized output of the variable optical delay line that is zero, to thereby measure the differential mode component.

2. The apparatus as set forth in claim 1, wherein the variable optical attenuator controls the optical power of the output of the first optical modulator such that the first output signal and the second output signal transmitted to the coherent optical receiver have the same optical power.

3. The apparatus as set forth in claim 1, wherein the first polarization controller controls the polarization of the output of the variable optical attenuator such that the first output signal and the second output signal transmitted to the coherent optical receiver have the same polarization.

4. The apparatus as set forth in claim 1, wherein the second polarization controller controls the polarization of the output of the variable optical delay line such that the first output signal and the second output signal transmitted to the coherent optical receiver have the same polarization.

5. The apparatus as set forth in claim 1, wherein the variable optical delay line controls time of the output of the second optical modulator such that the first output signal and the second output signal transmitted to the coherent optical receiver are made identical in time synchronization.

6. The apparatus as set forth in claim 1, wherein the network analyzer receives the output of the coherent optical receiver to measure a bandwidth, a common mode rejection ratio or channel skew of the coherent optical receiver.

7. The apparatus as set forth in claim 1, wherein the first optical modulator and the second optical modulator, controlled by the network analyzer via the controller, optically modulate the first path light and the second path light of the beam splitter, respectively such that the first output signal and the second output signal transmitted to the coherent optical receiver have same phase and intensity.

8. The apparatus as set forth in claim 1, wherein the first optical modulator and the second optical modulator, controlled by the network analyzer via the controller, optically modulate the first path light and the second path light of the beam splitter, respectively such that the first output signal and the second output signal transmitted to the coherent optical receiver have same intensity and opposite phases.

9. An apparatus for measuring performance of a coherent optical receiver, comprising:
a beam splitter configured to split light received from a light source into a first path light and a second path light;
a first optical modulator configured to receive the first path light of the beam splitter and optically modulate the received first path light;
a variable optical attenuator configured to control and output an optical power of an output of the first optical modulator;
a first polarization controller configured to transmit a first output signal controlling polarization of an output of the variable optical attenuator to the coherent optical receiver;
a second optical modulator configured to receive the second path light of the beam splitter and optically modulate the received second path light;
a variable optical delay line configured to delay and output time of an output of the second optical modulator;
a second polarization controller configured to transmit a second output signal controlling polarization of an output of the variable optical delay line to the coherent optical receiver;
a network analyzer configured to receive an output of the coherent optical receiver to measure performance of the coherent optical receiver and control the first optical modulator and the second optical modulator; and
a controller configured to receive a control signal from the network analyzer and transmit the received control signal to the first optical modulator and the second optical modulator; wherein
the controller controls the first optical modulator and the second optical modulator such that the first output signal and the second output signal transmitted to the coherent optical receiver have same phase and intensity, and
the controller is a power divider.

10. An apparatus for measuring performance of a coherent optical receiver, comprising:

a beam splitter configured to split light received from a light source into a first path light and a second path light;

a first optical modulator configured to receive the first path light of the beam splitter and optically modulate the received first path light;

a variable optical attenuator configured to control and output an optical power of an output of the first optical modulator;

a first polarization controller configured to transmit a first output signal controlling polarization of an output of the variable optical attenuator to the coherent optical receiver;

a second optical modulator configured to receive the second path light of the beam splitter and optically modulate the received second path light;

a variable optical delay line configured to delay and output time of an output of the second optical modulator;

a second polarization controller configured to transmit a second output signal controlling polarization of an output of the variable optical delay line to the coherent optical receiver;

a network analyzer configured to receive an output of the coherent optical receiver to measure performance of the coherent optical receiver and control the first optical modulator and the second optical modulator; and a controller configured to receive a control signal from the network analyzer and transmit the received control signal to the first optical modulator and the second optical modulator; wherein the controller controls the first path light and the second path light of the beam splitter such that the first output signal and the second output signal transmitted to the coherent optical receiver have same intensity and opposite phases, and the controller is a 180-degree hybrid.

* * * * *